J. B. STROUD.
DEMOUNTABLE RIM.
APPLICATION FILED MAR. 20, 1917.

1,246,678.

Patented Nov. 13, 1917.
2 SHEETS—SHEET 1.

WITNESSES

INVENTOR
J. B. Stroud,
BY Victor J. Evans
ATTORNEY

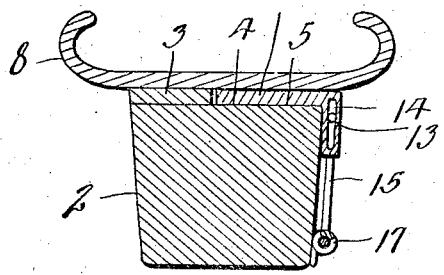
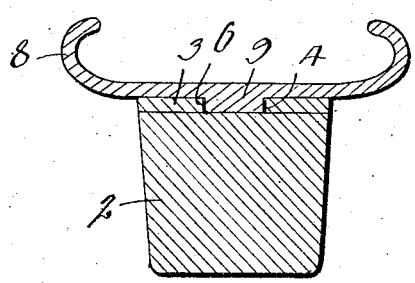
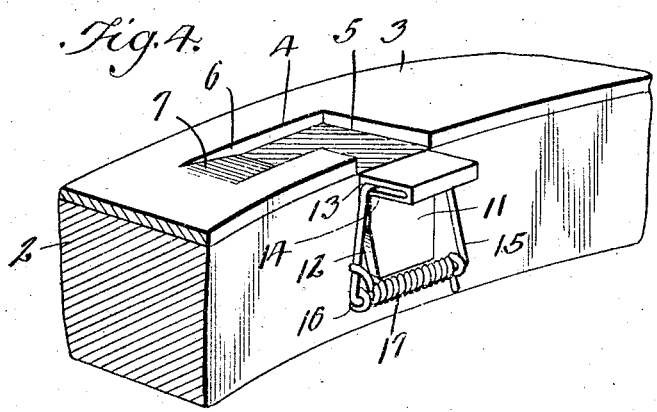
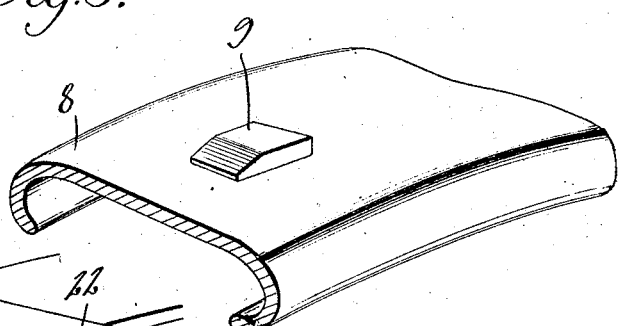
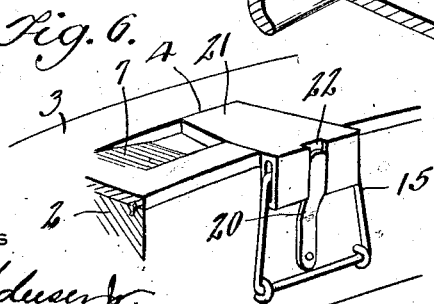

UNITED STATES PATENT OFFICE.

JOHN B. STROUD, OF PARIS, TEXAS, ASSIGNOR OF ONE-FIFTH TO G. B. EVANS, OF DALLAS, TEXAS.

DEMOUNTABLE RIM.

1,246,678.   Specification of Letters Patent.   Patented Nov. 13, 1917.

Application filed March 20, 1917. Serial No. 156,061.

*To all whom it may concern:*

Be it known that I, JOHN B. STROUD, a citizen of the United States, residing at Paris, in the county of Lamar and State of Texas, have invented new and useful Improvements in Demountable Rims, of which the following is a specification.

This invention comprehends the provision of a demountable vehicle rim, which may be quickly secured to or detached from the felly rim or band of a wheel and one of the objects of the invention is to provide such a structure of extremely simple and practical construction.
Another and more specific object of the invention is to provide a demountable rim having lugs adapted to fit within bayonet slots in the felly band and be secured therein against rotational movement relative to the wheel by a plurality of spring pressed wedges or keys.

The invention also aims to generally improve devices of this nature to render them more practical, cheaper to manufacture and more commercially desirable.

With these and other objects in view as will become more apparent as the description proceeds, the invention consists in certain novel features of construction, combination and arrangement of parts as will be hereinafter fully described, illustrated and claimed.

In the drawings,

Fig. 3 is a transverse sectional view on the plane of line 3—3 of Fig. 1.
Fig. 4 is a fragmentary perspective view of a portion of the vehicle wheel showing the felly band and spring pressed wedges, the latter being in inoperative position.

Fig. 5 is a fragmentary perspective view of the inner side of the demountable rim showing the lugs thereon, and Fig. 6 is a detail view showing a modified form of spring for the wedges.

Figure 1:
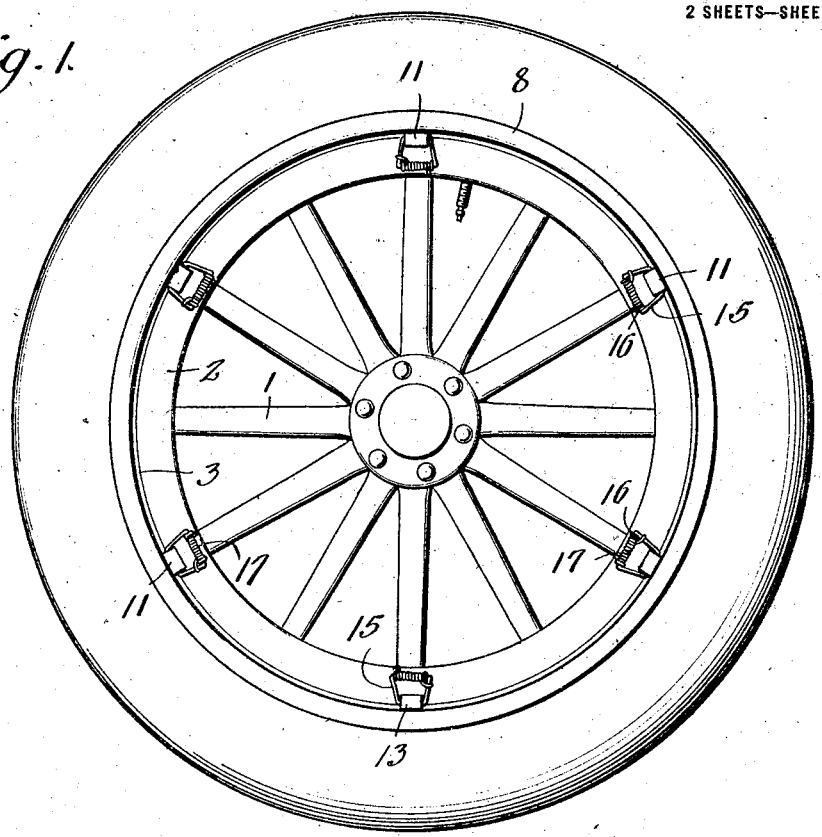
Figure 1 is a side elevation of a wheel equipped with my demountable rim.
Figure 2:
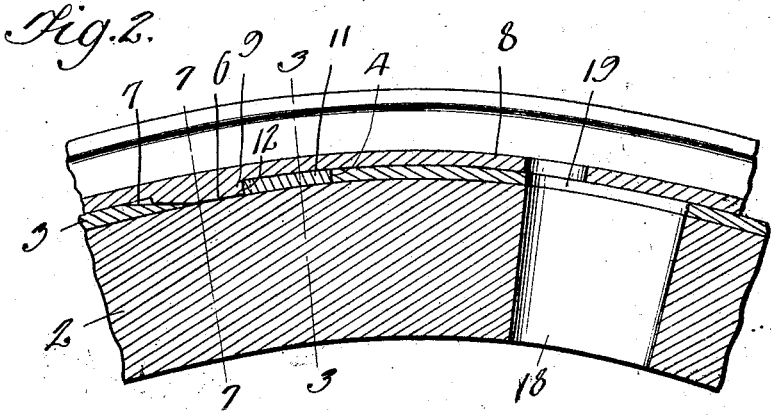
Fig. 2 is a fragmentary longitudinal sectional view through the wheel and rim.

Referring in detail to the drawings, by numerals, 1 designates a vehicle wheel having a felly 2 and felly rim or band 3, which is provided with a plurality of bayonet slots 4 opening upon the outer edge thereof. Each slot is provided with an entrance portion or passage 5 and a lug receiving portion 6 which extends circumferentially of the band centrally between the edges thereof. The rear end wall 7 of the lug receiving portion 6 of each of the slots is beveled upwardly and rearwardly from its forward edge as shown for a purpose to be hereinafter described.

The demountable rim 8 is of a slightly larger diameter than the felly band so as to be easily positioned thereon and is provided with a plurality of lugs 9 corresponding in number to the slot 4 and spaced the same distance apart as said slots. The lugs correspond in length to the width of the entrance openings 5 of the slots 4 and in width to the width of the lug receiving portion 6 of the slots. In positioning the rim on the wheel it is first moved laterally to insure the lugs in the slots 5 and is then given a rotational movement to carry the lugs to the beveled end of the portions 6 of the slots. The beveled walls 7 will engage the lugs and force them outward slightly to tighten the demountable rim on the wheel.

To hold the demountable rim properly positioned on the felly band or rim, I provide for each of the slots a wedge or key 11, which slides laterally through the entrance opening 5 of the slot and which has one side edge beveled for a portion of its length as at 12 to engage the corresponding lug 9 and force it toward the beveled or inclined wall 7. Each lug is formed on its outer end with a laterally projecting arm or flange 13 which is provided with a longitudinal slot 14 extending the full length thereof. A bail shaped link 15 extends through the slot 14 and is hingedly connected at its other end to the wheel felly 2 by staples 16 or other suitable fasteners. To force the link toward the felly and hold the lug from accidental displacement, I provide a coil spring 17. The slot 14 allows for sufficient play between the key or wedge 11 and the link 15 to permit of the former being moved longitudinally without longitudinal movement. When it is desired to detach the rim, the wedges are withdrawn from the slots and may be turned radially with respect to the wheel, as shown in the drawings, at which time they will be in an out of the way position so as to allow the demountable rim to be moved laterally from engagement with the wheel. The felly and felly band are formed respectively with slots 18 and 19 to accommodate the valve of the tire.

In the modified form, I have shown a flat spring 20 which is secured at its inner end to the felly and which bears at its outer end against the wedge 21. If desired, the wedge may be formed with a notch 22 to prevent lateral movement of the spring relative to the wedge.

From the foregoing description taken in connection with the accompanying drawings, it will be apparent that I have provided a very simple, practical and efficient demountable rim which may be quickly and securely attached to a vehicle wheel and which may be very easily detached therefrom.

While I have shown and described the preferred embodiments of my invention, it will be clearly understood that I do not wish to be limited to this construction, but may make such changes as will fall within the scope and spirit of the invention as claimed.

What I claim is:

1. A wheel having a felly and felly band, the felly band being formed with angular slots opening upon the outer edge thereof, said slots having circumferentially extending lug holding portions, a demountable rim having a plurality of lugs receivable within said slots and spring pressed wedging members insertible laterally within said slots to engage the lugs and force them along the circumferential portions of said slots, and links connecting said wedging member with the felly and having pivotal connection with the felly adapting them to turn on axes substantially parallel to the felly band.

2. A wheel having a felly and felly band, the felly band being formed with angular slots opening upon the outer edge thereof, said slots having circumferentially extending lug holding portions, a demountable rim having a plurality of lugs receivable within said slots and spring pressed wedging members insertible laterally within said slots to engage the lugs and force them along the circumferential portions of said slots, and links connecting said wedging members with the felly, said wedging members being pivotally mounted on the respective links.

In testimony whereof I affix my signature.

JOHN B. STROUD.